Patented Feb. 23, 1926.

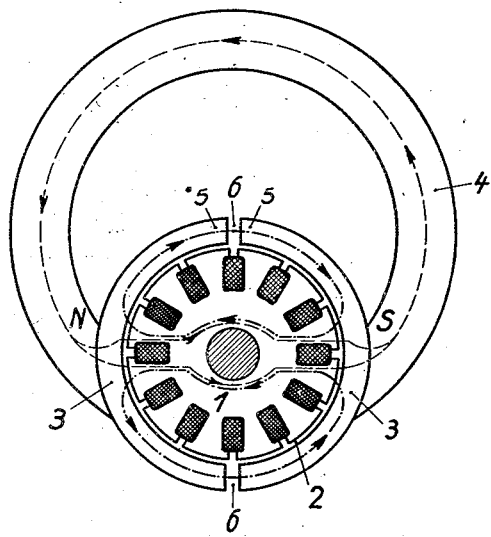
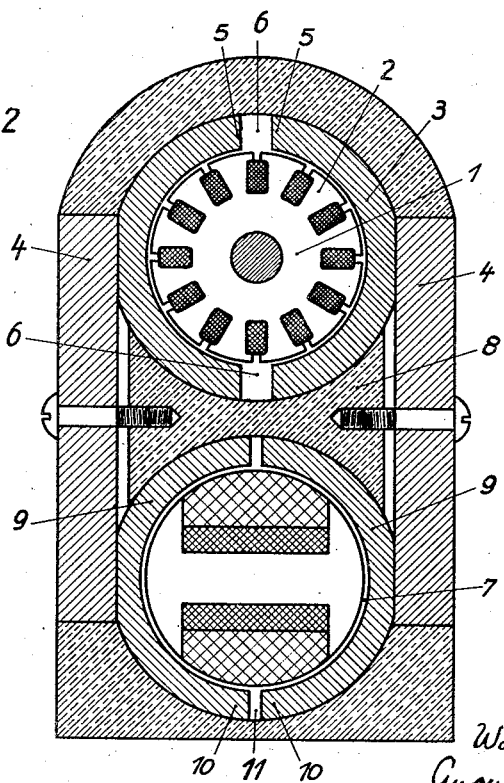

1,574,647

UNITED STATES PATENT OFFICE.

WALTER HÄHNLE AND AUGUST KAZENMAIER, OF STUTTGART, GERMANY, ASSIGNORS TO ROBERT BOSCH AKTIENGESELLSCHAFT, OF STUTTGART, GERMANY.

DYNAMO MACHINE.

Application filed August 6, 1923. Serial No. 656,079.

*To all whom it may concern:*

Be it known that we, WALTER HÄHNLE and AUGUST KAZENMAIER, citizens of Germany, residing at Stuttgart, Germany, have invented certain new and useful Improvements in a Dynamo Machine; and we do hereby declare the following to be a full, clear, and exact description of the invention, such as will enable others skilled in the art to which it appertains to make and use the same.

This invention relates in general to a dynamo machine provided with permanent magnets; more especially, it relates to a machine of this kind which is suited for use as a power-generating machine on a motor car. The permanent magnets of dynamo machines which are excited by these magnets must be comparatively long in order to produce the necessary strength of the exciting flux, and such machines require, therefore, much space which is often times not at disposal, especially on cars. The length of the magnets is a disturbing feature also in the building together of such a dynamo machine with a magneto-electric ignition apparatus.

Our invention relates to a dynamo machine which, although excited by permanent magnets, does not have the above mentioned objection. According to our invention, the use of comparatively long permanent magnets is avoided by providing a shunt for the lines of force of the armature field. As is known, in a machine of this type, the armature field is opposed to the exciting field and weakens the magnets. By providing a shunt for the lines of force of the armature field, the influence of the armature field on the magnets is diminished. The reluctance of the shunt must be so chosen that it is greater than that over the armature, but not greater than the reluctance of the magnet itself. The armature field will, in this way, close on one side over the pole shoes, without passing through the magnet, whereas, on the other side, the exciting field passes, as hitherto, essentially over the armature, the consequence being that the magnets may be made shorter without a deteriorating effect on the machine. The shunt is established, preferably, by arranging the ends of the pole shoes of the field magnets in close proximity to each other.

The invention is particularly useful when the dynamo machine devised according to it is combined with a magneto-electric ignition apparatus in such a manner that the armatures of said machine and said apparatus are arranged side by side, and the permanent magnets are connected at one end with the field poles of the dynamo machine and at the other end with the pole shoes of the ignition apparatus. The lines of force of the exciting fields close, then, on one side over the armature of the dynamo machine and on the other side over the armature of the ignition apparatus. Regarding known combinations of a similar kind there is attained in the new combination the effect and advantage that the arrangement is more compact which becomes especially apparent if also the ignition apparatus is provided with a shunt for the lines of force of the armature field.

Our invention is illustrated, by way of example, in the accompanying drawing, in which Figure 1 is a cross section through a dynamo machine constructed according to this invention, the exciting flux passing through the permanent magnet being drawn in dash-lines, and the flux of the armature field being drawn in dash-and-dot lines. Figure 2 is a cross section through the combination of such dynamo machine with an ignition apparatus.

The armature 1 of the dynamo machine rotates between pole shoes 3 which are in contact with the poles of a permanent magnet 4. In order to form the shunt characterizing this invention the ends 5 of the pole shoes are directed towards each other leaving only small gaps 6 which are so dimensioned that the reluctance for the lines of force over the gaps 6 is greater than the way they can find over the armature 1 plus twice the gap-width between the armature and the pole shoes. On the other hand, the reluctance of the gap 6 is less than the reluctance of the magnet 4 so that the greatest part of the lines of force of the armature field closes over this gap. As, consequently, also the counter-effect of the armature field relatively to the exciting field is diminished, the magnets 4 can be smaller than is the case without the magnetic shunt over the pole shoe ends.

The invention may be employed in connection with all kinds of dynamo machines having permanent magnets as exciting magnets.

In Figure 2, 7 is the ignition apparatus which is likewise provided with a shunt for the lines of force of the armature field, as described, for instance, in our pending United States application, Serial No. 510,931, filed Oct. 27, 1921.

The ignition apparatus 7 is arranged in a common casing with the dynamo machine 2 and the magnets 4 in such a manner that one pole of each magnet is in contact with the pole shoes 3 of the dynamo machine and the other pole is in contact with the pole shoes 9 of the ignition apparatus. The length of the pole shoes 9 is such that their ends 10 approach each other so much that only a small gap 11 is left, whereby the shunt is produced by which the demagnetizing effect of the flux of the lines of force in the ignition apparatus is diminished. The short magnets suffice completely to furnish the requisite excitation for the dynamo machine and the ignition apparatus.

Mounting the dynamo machine and the ignition apparatus together in the manner described offers also the advantage that the magnitude or strength of the flux of the lines of force passing through the armature of the dynamo machine can be altered so as to be greater or less than the flux of the lines of force passing through the armature of the ignition apparatus, that alteration being effected by providing gaps 6 and 11 of different width. The size of these gaps must be computed, in general, with consideration to the properties of the materials used for the magnets, as well as to the desired outputs of the two machines.

If the magnetic shunt is to be produced not directly by the pole shoe ends, the pole shoes may be provided with separate extensions which then approach each other as closely as desired. The shunt may be produced, of course, also independent of the pole shoes, in any other manner desired.

Finally, the magnetic shunt yields also the advantage that the demagnetization of the magnets 4 is obviated, if any one of the armatures is, or both are, removed from the machine.

We claim:

1. A combined lighting and ignition generator comprising a plurality of armatures, common field magnetic means, and means forming shunts for the lines of force of the fields of said armatures whereby said lines of force close without passing through said field magnetic means.

2. A combined lighting and ignition generator comprising a plurality of armatures, and a common magnetic field structure provided with pole shoes arranged in pairs, one pair for each armature, the opposed ends of said pole shoes approaching each other so closely as to thereby form magnetic shunts for the lines of force of the armature fields, the reluctance of each shunt being less than the reluctance of the magnetic field structure.

3. A combined lighting and ignition generator comprising a plurality of armatures, and a common magnetic field structure provided with pole shoes arranged in pairs, one pair for each armature, the opposed ends of said pole shoes approaching each other so closely as to thereby form magnetic shunts for the lines of force of the armature fields, the reluctance of each shunt being greater than the reluctance over one of the armatures, plus twice the width of the gap between the pole shoes and said armature, the reluctance of each shunt being less than the reluctance of the magnetic field structure.

4. The combination, with a dynamo machine having permanent exciting magnetic means, of means forming a shunt for the lines of force of the armature field and being adapted to cause said lines to close without passing through said magnetic means, of an ignition apparatus having the exciting permanent magnetic means of the dynamo machine also as its exciting magnetic means and being likewise provided with means forming a shunt of the same kind as that of the dynamo machine, this latter and the ignition apparatus being excited in series by said common magnetic means, as set forth.

5. The combination, with a dynamo machine having permanent exciting magnetic means, of means forming a shunt for the lines of force of the armature field and being adapted to cause said lines to close without passing through said magnetic means, of an ignition apparatus having the exciting permanent magnetic means of the dynamo machine also as its exciting magnetic means and being likewise provided with means forming a shunt of the same kind as that of the dynamo machine, this latter and the ignition apparatus being excited in series by said common magnetic means, the reluctances in the shunt of said dynamo machine and in the shunt of said ignition apparatus being different, substantially and for the purpose set forth.

In testimony whereof we have hereunto affixed our signatures.

WALTER HÄHNLE.
AUGUST KAZENMAIER.